United States Patent [19]
Morse

[11] 3,807,926
[45] Apr. 30, 1974

[54] PELLET MILL WITH POSITIVE FEED

[76] Inventor: George W. Morse, 9444 S. Wales Way, Elk Grove, Calif. 95624

[22] Filed: Apr. 6, 1972

[21] Appl. No.: 241,984

[52] U.S. Cl.................... 425/331, 425/DIG. 230
[51] Int. Cl............................................ B29c 3/02
[58] Field of Search............ 425/331, 314, DIG. 230

[56] References Cited
UNITED STATES PATENTS

| | | | |
|---|---|---|---|
| 3,332,111 | 7/1967 | Haflinger | 425/331 X |
| 3,134,344 | 5/1964 | Lundell | 425/331 X |
| 2,700,941 | 2/1955 | Johnson | 425/331 X |
| 2,063,404 | 12/1936 | Selman | 425/331 |

FOREIGN PATENTS OR APPLICATIONS

| | | | |
|---|---|---|---|
| 1,278,103 | 10/1961 | France | 425/331 |

Primary Examiner—J. Spencer Overholser
Assistant Examiner—David S. Safran
Attorney, Agent, or Firm—Flehr, Hohbach, Test Albritton & Herbert

[57] ABSTRACT

Pellet mill for extruding material having a housing with a ring die structure mounted in the housing and a plurality of rolls mounted in the die structure. Means is provided for causing relative rotation between the rolls and the rotating die structure. Center feed means is provided for rotating the material at high velocity and for positively feeding the material into spaces between the rolls and the die and for distributing the material generally uniformly along the width of the rolls so that during said relative motion said material is extruded through the die structure.

In the method, the material to be extruded is rotated at relatively high speed and is then introduced axially of the die structure and distributed generally uniformly along the width of the rolls.

13 Claims, 6 Drawing Figures

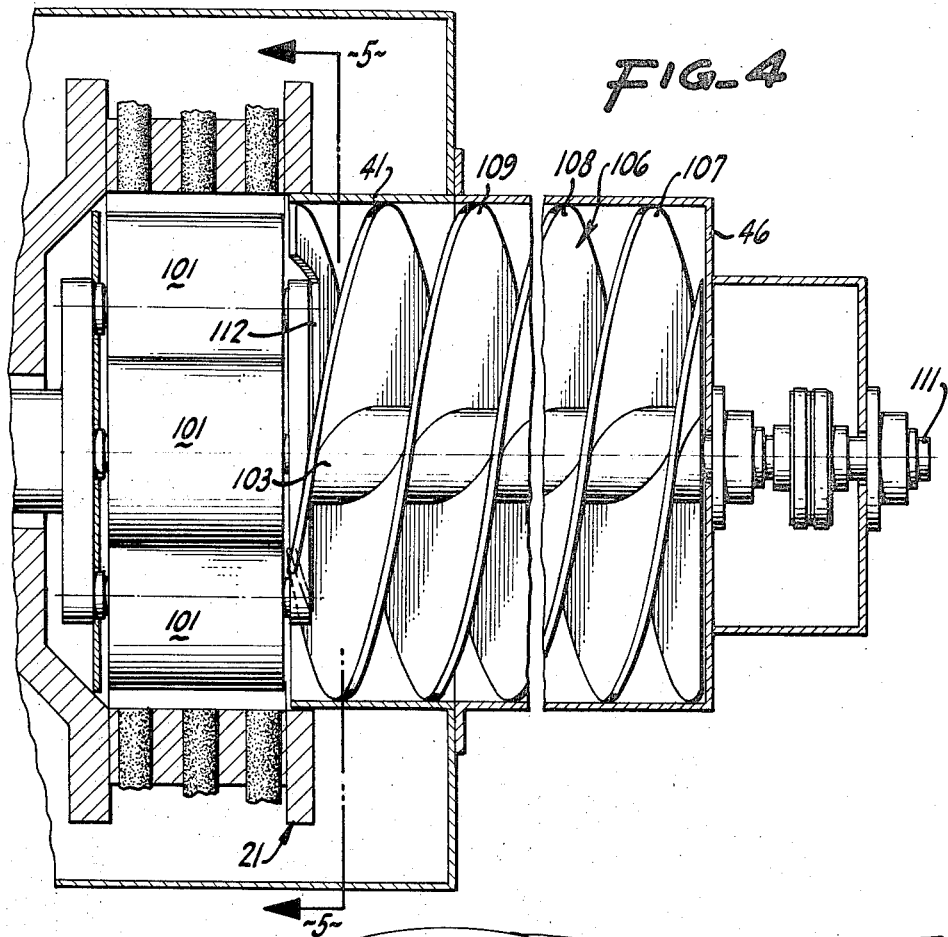
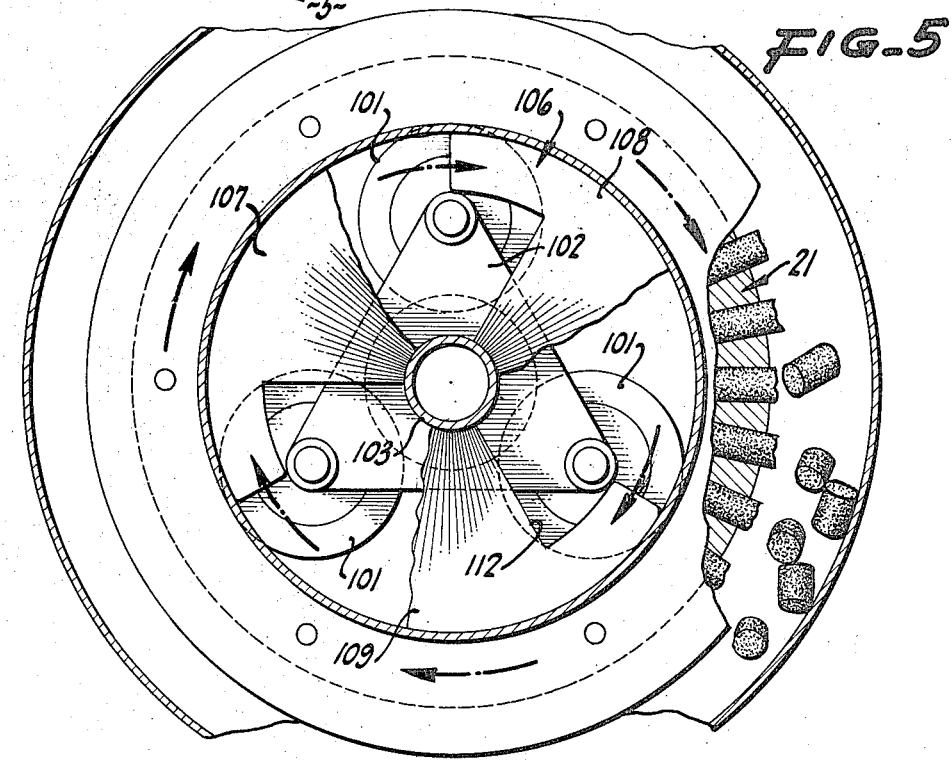

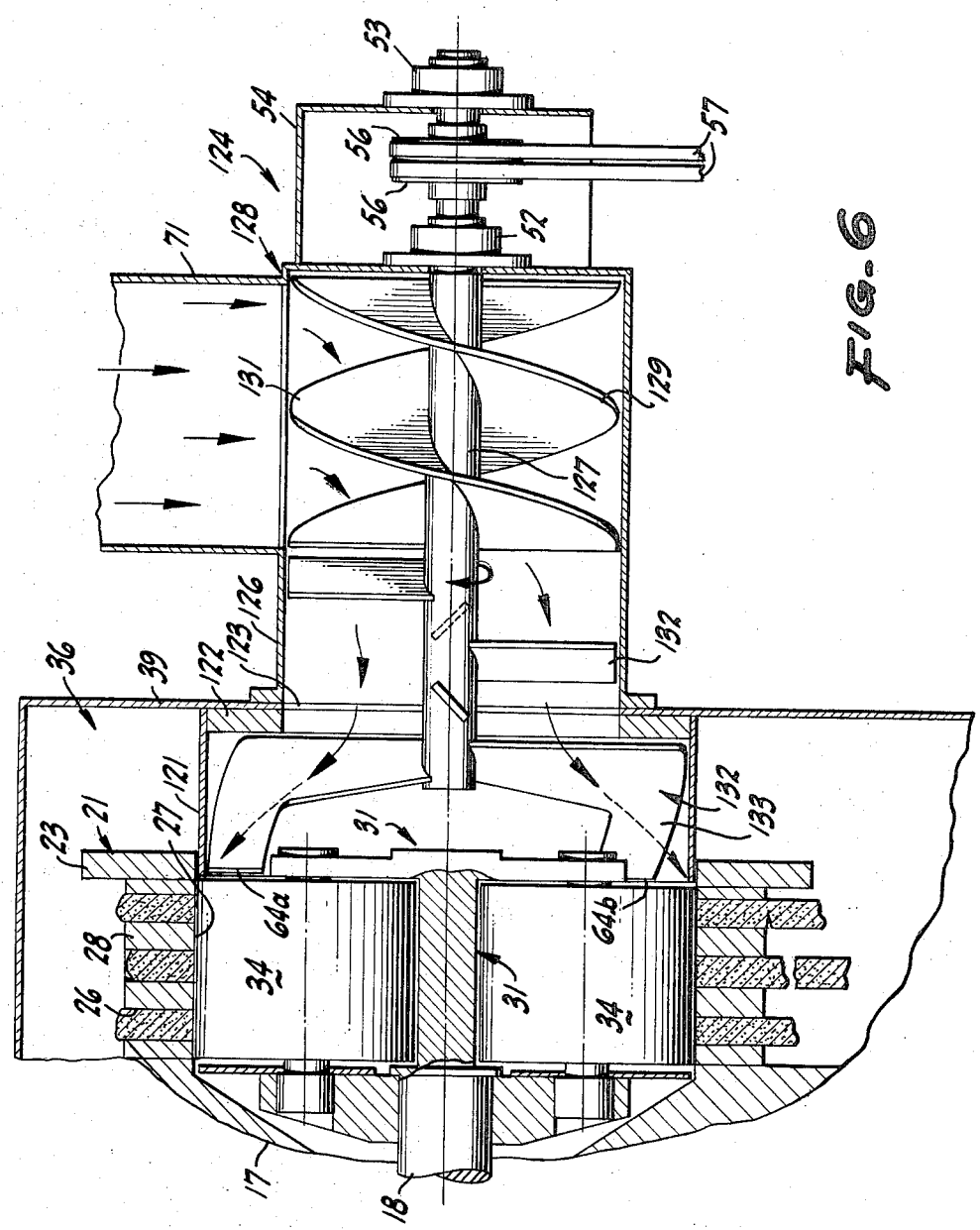

PELLET MILL WITH POSITIVE FEED

BACKGROUND OF THE INVENTION

Pellet equipment has heretofore been provided which have utilized center feeders or force feeders to convey material from the mixers to the die chamber. Stationary scrapers or plows have been utilized for diverting the material into positions in front of the rollers so that the material will be extruded through the die. Such pelleting machines have been particularly unsatisfactory when utilized in conjunction with low density, bulky material such as long chopped hay which has poor flow characteristics. In order to hold the product together on the discharge side of the die, a relatively slow die speed must be used. This low die speed diminishes the centrifugal force holding the material against the inside of the die as it rotates which is contrary to the requirement for greater die speeds and higher centrifugal forces for light, bulky material. Consequently, the scrapers or plows used to push the material in front of the rollers also work less effectively. There is, therefore, a need for new and improved pelleting equipment which can handle such low density, bulky materials.

SUMMARY OF THE INVENTION AND OBJECTS

The pellet mill for extruding material consists of a framework. A housing is mounted on the framework. A ring die structure is mounted in the housing. A plurality of rollers are mounted in the die structure. Means is provided for causing relative movement between the rollers and the ring die structure. Means is provided for rotating the material at high speed and for positively feeding the material axially into the die structure and for distributing the material generally uniformly along the widths of the rollers.

In general, it is an object of the present invention to provide a pellet mill and method of the above character which can be utilized for extruding low density, bulky material.

Another object of the invention is to provide a pellet mill and method of the above character which can be utilized for extruding long chopped hay.

Another object of the invention is to provide a pellet mill and method of the above character which can operate with relatively low die speeds without limiting production.

Another object of the invention is to provide a pellet mill and method of the above character in which the material is rotated at a relatively high velocity and introduced axially of the die structure.

Another object of the invention is to provide a pellet mill and method of the above character in which the material to be extruded is introduced axially between the rollers and the die and distributed relatively uniformly along the lengths of the rollers.

Another object of the invention is to provide a pellet mill and method of the above character in which the material is positively controlled in its movement into the die structure.

Another object of the invention is to provide a pellet mill and method of the above character which can be utilized with two or three or more rollers.

Another object of the invention is to provide a pellet mill and method of the above character in which an auger is utilized under the feed chute for the center feeder.

Another object of the invention is to provide a pellet mill and method of the above character in which relatively high capacity production can be obtained from light, bulky materials.

Another object of the invention is to provide a dense product comprised of predominantly coarse roughage suitable for ruminant animals and which has good flow characteristics.

Another object of the invention is to provide a pellet mill and method of the above character which minimizes uneven die wear.

Additional objects and features of the invention will appear from the following description in conjunction with the drawings.

BRIEF DESCRIPTION OF THE DRAWINGS

FIG. 4 is a cross-sectional view similar to FIG. 2 of another embodiment of the present invention.

FIG. 5 is a cross-sectional view taken along the line 5—5 of FIG. 4.

FIG. 6 is a cross-sectional view of still another embodiment of a pellet mill incorporating the present invention.

DESCRIPTION OF THE PREFERRED EMBODIMENT

Figure 1:
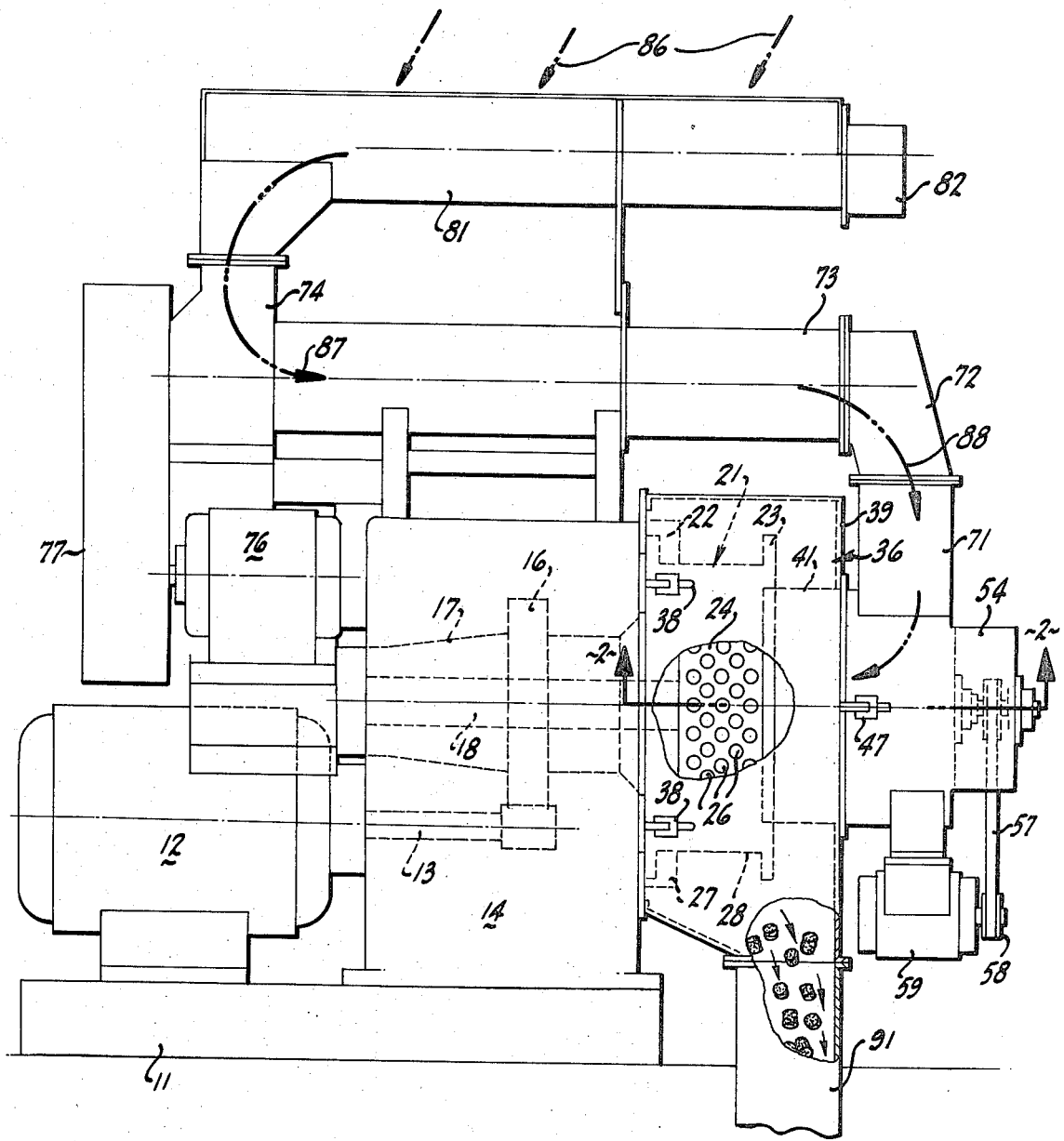
FIG. 1 is a side elevational view of a pellet mill incorporating the present invention with certain portions being broken away.
Figure 2:
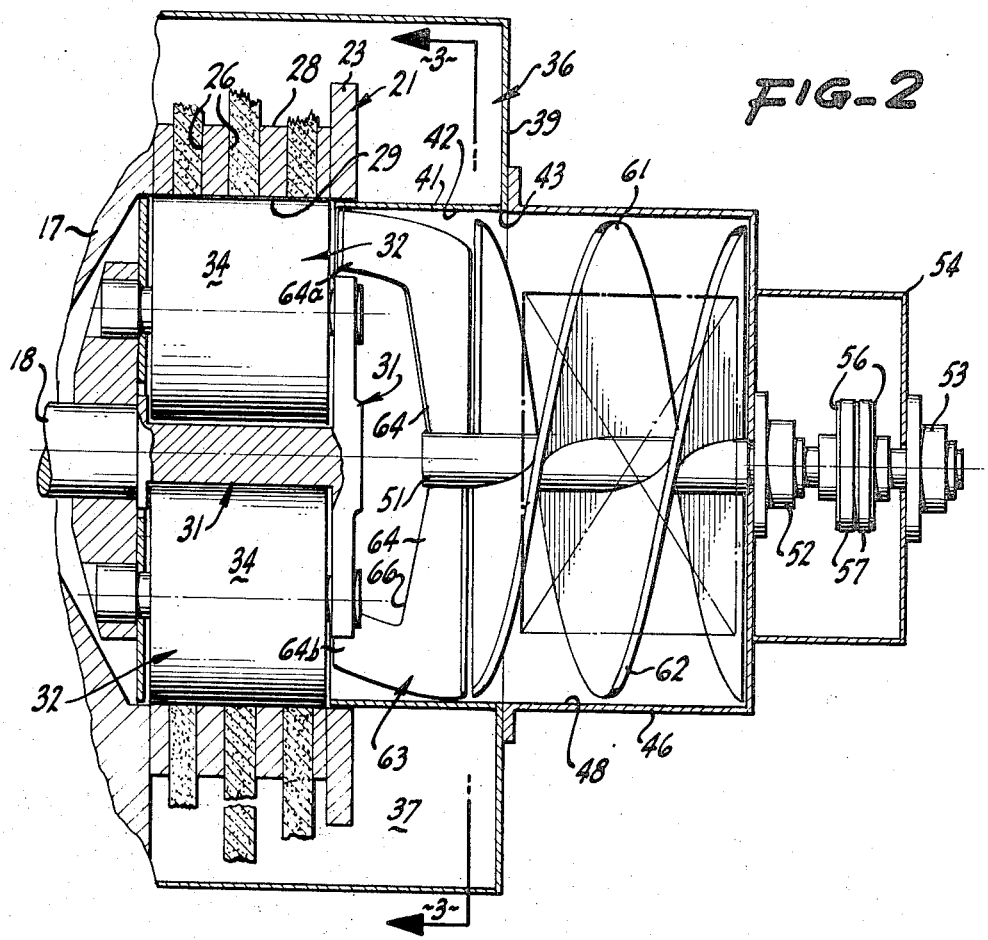
FIG. 2 is a cross-sectional view taken along the line 2—2 of FIG. 1.
Figure 3:
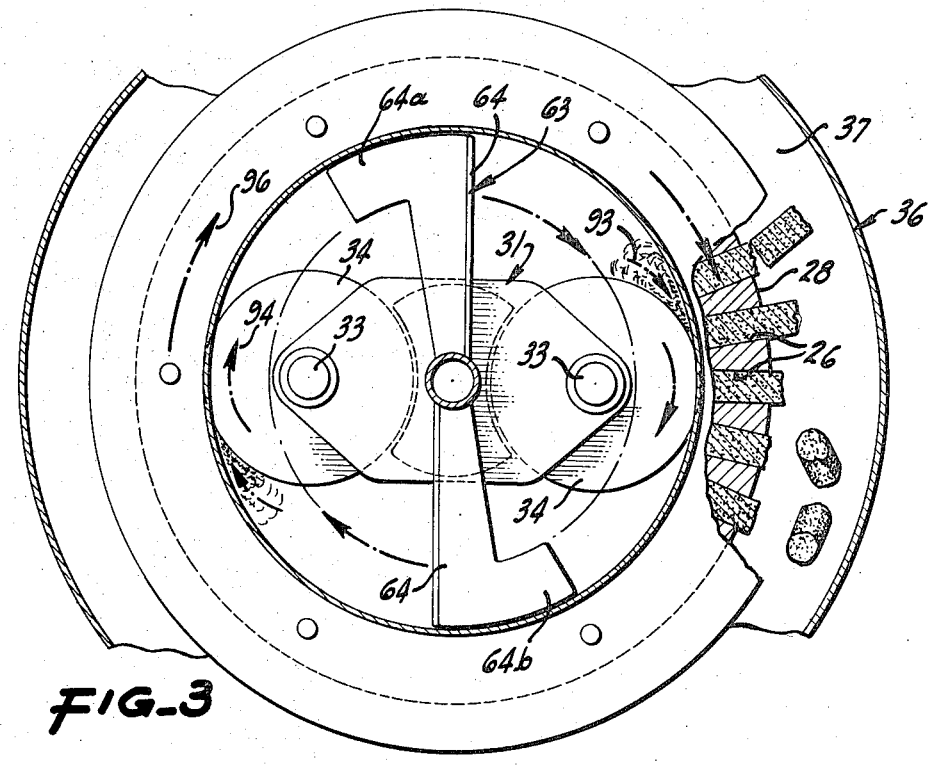
FIG. 3 is a cross-sectional view taken along the line 3—3 of FIG. 2.

The pellet mill shown in FIGS. 1–3 of the drawing consists of a base 11 which is adapted to be mounted upon a suitable foundation (not shown). A main drive motor 12 is mounted upon the base which drives a drive pinion 13 that is provided as a part of a gear box 14 also mounted upon the base 11. The drive pinion 13 drives a main gear 16 which is keyed to a quill shaft 17 that is rotatably mounted upon a main shaft 18. The main shaft 18 is held in a stationary position by being splined into a gear pin assembly (not shown) within the gear box 14.

A circular die structure 21 is provided and has an inner radially extending flange 22 and an outer radially extending flange 23 which are parallel and spaced apart on opposite ends of a cylindrical die 24. The die 24 is provided with a plurality of longitudinally aand circumferentially spaced holes 26 extending radially of the die. The circular die structure 21 is clamped to the quill shaft 17 by a die clamp assembly 27 which engages the inner flange 22 so that the circular die structure 21 will rotate with the quill shaft 17. The die 24 is provided with an outer cylindrical surface 28 and an inner cylindrical surface 39 concentric with the outer cylindrical surface 28 and through which the holes 26 extend.

A roller support assembly 31 is mounted on the outer end of the main shaft 18 and carries a pair of spaced roller assemblies 32. Each of the roller assemblies 32 includes an eccentric roller shaft 33 which has a roller 34 rotatably mounted thereon. In a manner well known to those skilled in the art, the eccentric roller shaft 33 can be rotated for each of the rollers to bring the rollers into engagement with the inner cylindrical surface 29 of the die 24 to extrude material through the die. The eccentric roller shaft 33 also makes it possible to adjust the roller and the die to accommodate wear in either or both the roller and the die.

A cylindrical cover 36 forms a pellet chamber 37 which is open at one end, is hinged at one side to the gear box 14 and is of such a size so it can extend over and cover the circular die structure 21 and be clamped to the other side of the gear box by suitable means such as clamps 38. This permits the covers to be moved between open and closed positions with respect to the circular die structure 21.

Particularly novel center feed means is provided for supplying the material which is to be extruded through the circular die structure 21 and consists of a cylindrical sleeve 41 that is secured to the interior of the cover 36 by suitable means such as welding. The sleeve 41 has an inner cylindrical opening 42 which has a diameter which is substantially identical to the diameter of the inner cylindrical surface 29 of the die 24. The sleeve 41 has an outer diameter so that it can enter into the opening formed by the inner cylindrical surface 29 of the die 24 and be in relatively close proximity to the forward extremities of the rollers 34, as shown particularly in FIG. 3. The sleeve 41 is also sized so that it can be readily moved into and out of the die 24 as the cover 36 is opened and closed with respect to its hinges on the gear box. The front wall 39 of the cover 36 is provided with an opening 43 which is the same size as the cylindrical opening 42 provided in the sleeve 41.

Center feed means is provided for the pellet mill and consists of feeder housing 46 which is generally cylindrical in shape. The housing is mounted on the cover 36 so that it can be moved between open and closed positions with respect to the opening 43 in the cover 36. Clamps 47 are provided for holding the housing in the closed position. The feeder housing 46 is provided with an inner cylindrical opening 48 of the same diameter as the openings 42 and 43 and is axially aligned therewith when the housing is in the closed position.

A feed or auger shaft 51 extends through the feeder housing 46 and the sleeve 41 and is rotatably mounted in a bearing assembly 52 secured to the feeder housing 46 and in another bearing assembly 53 carried by a housing 54 secured to the housing 46. A pair of sheaves 56 are mounted on the shaft 51 and are driven by V-belts 57. The V-belts 57 are driven by a sheave or pulley 58 which is driven by motor 59 secured to the bottom of the housing 46 so that it moves with the housing. As can be seen, the belts 59 extend upwardly into the housing 54.

A two-flighted auger is mounted upon the shaft 51 and consists of flights 61 and 62 which have a diameter which is only slightly less than the inner diameter of the housing 46 and the sleeve 41. The flights 61 and 62 commence at the outer extremity of the housing 46 at points 180° apart and extend the entire length of the housing 46 and extend through the opening 43 in the pellet chamber 36 and into the sleeve 41. Generally, it is desirable that the flights 61 and 62 have a diameter which corresponds generally to the inner diameter of the die 24. A blade assembly 63 is mounted on the inner extremity of the shaft 51 and is rotated with the shaft 51. The blade assembly 63 is provided with two radially extending blades 64 which are diametrically aligned. Each of the blades 64 is provided with an outwardly extending portion 64a which also extends radially (see FIG. 3) and an inwardly inclined portion 64b that extends inwardly to a position so that it is in relatively close proximity to the forward extremities of the rollers 34 and adjacent the outer margins of the same as shown particularly in FIG. 2. Each of the blades 64 is provided with a cut-out 66 to accommodate the roller support assembly 31. As can be seen from FIG. 3, each of the blades 64 is identical and when mounted on the shaft 51 extend toward the rollers 34 in opposite directions as can be seen particularly from FIG. 3. As can be seen from FIG. 2, the blades 64 commence at the termination of the flights 61 and 62 and extend inward to the rollers 34.

Means is provided for supplying the material which is to be extruded or pelletized into the feeder housing 46 and consists of a chute 71 which is secured to the housing 54 and opens directly into the upper end of the housing immediately overlying the auger assembly formed by the flights 61 and 62 on the shaft 51. The chute 71 moves with the housing 54. It is adapted to receive material from a mixer discharge housing 72 which is mounted on the forward extremity of the mixer assembly 73 of a conventional type that is mounted upon the gear box 14 as shown in FIG. 1. The mixer assembly 73 extends longitudinally over the gear box 14. The mixer housing has mounted thereon a shaft (not shown) carrying mixer blades for mixing various ingredients with the material immediately before it is supplied to the die for extruding. A mixer inlet housing 74 is connected to the inlet of the mixer assembly 73. Means is provided for driving the mixer assembly 73 and consists of a motor 76 with drive sheaves and belts (not shown) covered by a guard cover 77.

Means is provided for supplying material to the mixer inlet 74 and consists of an auger type feeder 81 of a conventional type which is driven by a motor 82. Means, also of a conventional type, is provided for supplying the material to the auger type feeder 81 as indicated by the arrows 86. The material is then supplied from the auger type feeder to the mixer as indicated by the arrows 87 and from the mixer to the housing 54 as indicated by the arrows 88.

Means is provided for receiving the pellets as they are extruded into the pellet chamber 37 and consists of a chute 91 which is secured to the lower extremity of the cover 36 as shown particularly in FIG. 1. The pellets are delivered by the chute 91 to conventional handling equipment.

OPERATION

Operation and use of the pellet mill may now be briefly described as follows. Let it be assumed that the pellet mill is placed in operation and that the gearing is such a size that the die 24 is rotated at a speed of approximately 180 RPM. Also, let it be assumed that the drive provided by the motor 56 is such that the feeder or auger carried by the shaft 51 can be rotated at a speed ranging from 500 to 1500 RPM. Also, let it be assumed that it is desired to pelletize relatively bulky material such as hay which has very low specific gravity and a very low density factor as well as poor flow characteristics. Let it also be assumed that it is desired to form relatively large pellets as, for example, one-half inch or larger in diameter and that a die structure 21 having appropriate hole sizes has been selected and placed in the pellet mill. Let it be assumed that the hay which is to be pelletized has been chopped to appropriate lengths as, for example, ¾ to 1 inch in length and is supplied to the feeder 81. It is then supplied to the mixer 73 in which additional ingredients can be added to the hay if desired. Hay is then supplied as indicated by the arrows into the feed chute 71 into the housing 54 which receives the material and rapidly brings it up to a speed so that the material is rotating at a high velocity and positively feeds the material into the interior of the die. Since the feed material is being rotated at a high velocity, it moves outwardly under centrifugal force against the walls of the housing 46 and the sleeve 41. The material is also continuously and positively advanced by the flights 61 and 62 of the auger assembly and by the blades 64. Thus, the material is continuously introduced into the die over substantially the entire open end of the die and between the rollers and the die for extrusion through the die.

It is believed that the high peripheral speed of the feeder or auger assembly is very influential in obtaining the greatly improved handling capabilities for light, bulky materials which have poor flow characteristics and for significantly improving the tonnage production of pellets from a pellet mill with minimum fines and breaking apart of pellets. The high peripheral speed of the feeder assembly ensures that the material will be distributed uniformly across the face of the die, i.e., longitudinally of the die and the roller asssemblies. In addition, it always ensures that there is a flight or blade which is pushing material into the wedge-shaped space between each roller and the die in order to obtain more even feeding of the die. The high peripheral speed also ensures that the material is thrown to the outer periphery of the feeder housing so that the flighting which is used in the feeder can readily pick it up and deposit it in the wedge-shaped spaces between the rollers and the die as shown in FIG. 3 and as indicated by the arrows 93, with the direction of the rollers being indicated by the arrows 94 and the direction of rotation of the die being indicated by the arrows 96. It also can be seen that the material is continuously and positively fed by the feeder to the die and is always under positive control of the feeder which ensures that the material will be uniformly distributed in the die.

In view of the fact that it is possible to obtain this excellent distribution of the feed material into the die and to obtain high production from the pelleting machine, it is unnecessary to operate the die at high rates of speed. Thus, it has been found that it is possible to pelletize various types of material utilizing relatively low die rotation speeds ranging from 130 to 200 RPM. This makes it possible to obtain more uniform pellets and to prevent undue breakup of the pellets as they are being extruded from the die.

By the utilization of the feeding means herein disclosed on a conventional pellet mill, it has been found that to obtain excellent tonnage production of pellets with such a pellet mill utilizing bulky material whereas in the past it has been very difficult to feed such material into pellet mills and to obtain satisfactory tonnage production. By way of example, with conventional pellet mills such as one of the 200 Series of California Pellet Mill, it has been found that it requires a maximum effort to obtain a production of as much as 4 tons of pellets from relatively coarse material, whereas with the present invention incorporated in the pellet mill, production of 6 to 8 tons of pellets per hour, with each pellet having a diameter of 1 1/8 inches and a length of approximately 2 inches, can be readily obtained without overloading the pellet mill. Such large pellets are particularly suitable for large animals such as cows and horses. Because of the more uniform feeding of the material to the die, there is less die and roller wear. Also, any wear which does occur is much more uniform than has been the case in the past.

With the construction of the feeding means provided in the present invention, it can be seen that it has been possible to eliminate stationary scrapers, plows or other stationary diverting means for depositing material into the die.

Although a two-flighted auger has been shown in the embodiment disclosed in FIGS. 2 and 3, it is readily apparent that additional flights may be utilized if desired. Also, it is apparent that, if desired, different angles can be utilized on the flights while still obtaining satisfactory results. It is merely necessary that the feed material be positively delivered into the die and into close proximity to the die and that it be delivered adjacent the inner surface of the die. In other words, the feeder assembly should have roughly the same diameter as the inside diameter of the die.

In the embodiment shown in FIGS. 1, 2 and 3, a two-flighted auger has been chosen having flights spaced 180° apart so that it would correspond to the two-roller assemblies which have been provided. However, it should be appreciated that if desired, additional flights could be provided even with two-roller assemblies.

It also should be appreciated that the present invention is applicable to other types of pellet mills. For example, as shown in FIGS. 4 and 5, it can be seen that the invention is readily applicable to a pellet mill which is provided with three roller assemblies 101 rotatably mounted upon a roller support assembly 102 mounted upon a main shaft 103. Since the three roller assemblies which have been provided are spaced 120° apart, a three-flighted auger assembly 106 has been provided as a part of the feeder assembly as can be seen from FIG. 4. The auger assembly 106 consists of three flights 107, 108 and 109 which are offset by 120° with respect to each other. The flights are mounted upon a shaft 111 which is driven in the same manner as shaft 51 in the previous embodiment. It will be noted that the flights 107, 108 and 109 extend inwardly from the outer extremity of the housing 46 and through the sleeve 41 and up to a position immediately adjacent the roller assemblies 101 as shown in FIG. 4. Cut-outs 112 are provided to accommodate the roller support assembly 102.

The operation and use of this embodiment of the pellet mill incorporating the present invention is very similar to that hereinbefore described. The feed material is supplied to the housing 46 in the same manner as in the previous embodiment. The auger assembly 106 is rotated at a high rate of speed and the material is flung to the outer peripheries of the housing 46 and the sleeve 41 where it is engaged by the flights and rapidly moved axially into the die structure 21 adjacent the inner cylindrical surface and into the wedge-shaped spaces formed between the roller assemblies 101 and the inner cylindrical surface to rapidly extrude the material through the die to form pellets as shown. As with the preceding feeder assembly, the present feeder assembly also operates in a very efficacious manner to uniformly distribute the material to be pelletized longitudinally over the surface of the die and into the wedge-shaped spaces formed between the rollers and the die.

Similar increases in productivity of the pellet mill as described in conjunction with the foregoing embodiment have been obtained. Relatively low die speeds ranging from 130 to 200 RPM can be utilized while using feeder shaft speeds ranging from 500 to 1500 RPM. Both coarse and fine materials can be pelletized with such a pellet mill while still obtaining high production.

Still another embodiment of the present invention is shown in FIG. 6 which is very similar to the embodiment shown in FIGS. 1 and 2 with the exception that the center feeding means has been modified. It consists of a cylindrical sleeve 121 that is secured to the front wall 39 of the cover 36 by the use of an annular ring 122 which is secured to the wall 39 of the cover 36 and the sleeve 121 by welding. As will be noted, the sleeve 121 is the same size as the outer flange of the circular die structure 21 and is adapted to seat therein as shown particularly in FIG. 6. An opening 123 is formed within the wall 139 and in the ring 122.

A center feeder assembly 124 is secured to the wall 39 of the cover 36. The center feeder assembly consists of a cylindrical sleeve 126 secured to the outer wall of the cover 36. It will be noted that the cylinder 126 as a diameter which is substantially less than that of cylinder 121. It should be appreciated that in connection with the description of the present embodiment that the cylinder 126 could have the same diameter as the cylinder 121. It can be seen that the cylinder 126 is in axial alignment with the axis of the pellet mill and with the axis of rotation of the roller support assembly 31. A shaft 127 is mounted within the cylinder 126 and the cylinder 121. A pair of bearing assemblies 52 and 53 are provided for supporting the shaft 127 in a manner hereinbefore described in conjunction with the previous embodiment. Thus, it can be seen that the shaft 127 is supported in a cantilever fashion. The feed chute 71 is connected to the cylindrical member 126 by suitable means such as welding. The feed chute 71 is open at its lower end and is adapted to supply material into the remote end of the cylinder 126.

The feeder assembly 124 also includes rotary feed means 128 mounted on the shaft 127. The rotary feed means consists of flights 129 and 131 forming an auger mounted upon the shaft 127. The flights start 180° apart with the commencement of the cylinder 126 and extend through the cylinder 126 slightly greater than one-half the length of the cylinder 126 with the auger assembly underlying the feed chute 71 so that it receives feed from the chute and advances the same. As can be seen from FIG. 6, the lengths of the flights 129 and 131 have been limited to provide space for a plurality of blades 132 which are mounted on the shaft 127. As can be seen from FIG. 6, the blades 132 have a generally planar surface and are mounted on the shaft 127 so they are displaced at an angle of approximately 45° with respect to the axis of the shaft and at an angle of approximtaely 90° with respect to each other.

In addition, the blades are spaced axially on the shaft about the circumference of the shaft. The blades have a length such that they just clear the inner surface of the wall 126. Thus, as shown, there have been provided four of such blades 131 which cooperate with the flights 129 and 131 to supply the feed material to a blade assembly 132 which is substantially identical to the blade assembly 63 in the embodiment shown in FIGS. 1-3. The blade assembly 132 consists of two blades 133 which are formed in the same manner as the blades 64 in the previous embodiment.

The auger formed by flights 129 and 131 has been dimensioned so that it underlies the feed chute 71 to receive the material from the feed chute 71 and to deliver it positively into the cylinder 126 forming a part of the center feed assembly for the pellet mill as shown in FIG. 6. The feed material is delivered by the auger to the blades 132 which serve to break up any lumps in the feed material and to distribute the feed material uniformly within the cylinder 126 as the shaft 127 is rotated by the drive belts 67. Because of the inclination of the blades 131, the feed material is rapidly advanced forwardly and delivered to the blade assembly 132 which delivers the feed material to the rollers 34 in the manner hereinbefore described in conjunction with the previous embodiment shown in FIGS. 1-3.

From the embodiment shown in FIG. 6, it can be seen that it is possible to utilize a feeder assembly, a portion of which is of reduced diameter and which will still work satisfactorily for delivering a high volume of feed material to the pellet mill without difficulty. This is made particularly feasible because the blade assembly 132 is of increased diameter and is of the same general diameter as the inner cylindrical surface of the die 24.

Also, it can be seen that one feature of the present invention which is particularly significant is the fact that a flighted auger is provided immediately beneath the feed chute 71 to receive the feed material from the feed chute and to positively deliver the same forwardly toward the die without plugging the feeder assembly for the pellet mill.

In all embodiments of the invention, it can be seen that the feeder assembly is of relatively large diameter at the point where the feed material is introduced into the die. In addition, the feed material is being introduced rapidly in an axial direction while at the same time having a high peripheral speed. The high peripheral speed ensures that the bulk of the feed material will be very close to the outer walls of the cylinders 124 aNd 121 so that it can be readily advanced forward by the feeder assembly and introduced into the die immediately in front of the rollers 34 as hereinbefore described.

It is apparent from the foregoing that there has been provided a pellet mill with positive feed and a method for pelletizing feed materials and other types of materials which makes possible greatly improved productivity with less wear on the pellet mill. Low density, bulky materials may be pelletized without significantly decreasing production from the pellet mill.

I claim:

1. In a pellet mill for extruding material, a base, a housing mounted on said base, a cylindrical die structure mounted in the housing, said die structure having a cylindrical inner surface with holes formed therein opening through said inner surface, a plurality of rollers mounted in said die structure and adapted to travel over said inner cylindrical surface, means for causing relative rotation of said die structure and said rollers so that said rollers will travel over said inner cylindrical surface and forming moving wedge-shaped spaces between the rollers and the cylindrical inner surface, feed sleeve means disposed adjacent said cylindrical die structure and having an inner surface with a diameter substantially the same as the diameter of the cylindrical inner surface of the die structure and feed means in the feed sleeve means extending radially to a position adjacent the inner surface of the feed sleeve means for rotating the feed material at a relatively high speed independently of the rotation of the rollers and positively feeding the material into the cylindrical die structure and into the wedge-shaped spaces formed between the rollers and the die for distributing the die material generally uniformly along the width of the rollers, said feed means including a member having a portion thereof rotating in very close proximity to one end of each of the plurality of rollers and one end of each of the wedge-shaped spaces.

2. A pellet mill as in claim 1 wherein the means for positively feeding material includes rotary feeding means rotating at a speed above 500 RPM said rotary feeding means including said member as a part thereof.

3. A pellet mill as in claim 2 wherein said portion of said member rotating in close proximity to the ends of said rollers is inclined at an angle with respect to the axes of rotation of the rollers.

4. A pellet mill as in claim 2 wherein said feed sleeve means extends into said die.

5. A pellet mill as in claim 4 wherein said feed means includes a flighted auger rotatably mounted in said feed sleeve means.

6. A pellet mill as in claim 5 wherein said flighted auger extends substantially the entire length of said feed sleeve means.

7. A pellet mill as in claim 5 wherein said flighted auger is provided with the number of flights corresponding to the number of roller assemblies.

8. A pellet mill as in claim 5 wherein said flights of the auger terminate immediately adjacent said roller assemblies.

9. A pellet mill for extruding material, a base, a housing mounted on said base, a cylindrical die structure mounted in the housing, said die structure having a cylindrical inner surface with holes formed therein opening through said inner surface, a plurality of rollers mounted in said die structure and adapted to travel over said inner cylindrical surface, means for causing relative rotation of said die structure and said rollers so that said rollers will travel over said inner cylindrical surface and form moving wedge-shaped spaces between the rollers and the inner cylindrical surface, a center feed assembly mounted on said housing for delivering feed material into the cylindrical die structure and into the wedge-shaped spaces formed between the rollers and the die structure and a feed chute for delivering feed material to the center feed assembly, said center feed assembly including feed sleeve means adjacent the cylindrical die structure and having an inner cylindrical surface of substantially the same diameter as the inner cylindrical surface of the die structure and an auger driven independently of the rollers and the die structure underlying said feed chute for delivering feed material from said feed chute and supplying the same axially of the center feed assembly, said center feed assembly including a blade assembly extending from the termination of said auger to said roller assemblies and to a radial position adjacent the inner cylindrical surface of the feed sleeve means, said blade assembly including portions which are disposed adjacent the outer ends of the rollers and the ends of said wedge-shaped spaces.

10. A pellet mill for extruding material, a base, a housing mounted on said base, a cylindrical die structure mounted in the housing, said die structure having a cylindrical surface with holes formed therein opening through said inner surface, a plurality of rollers mounted in said die structure adapted to travel over said inner cylindrical surface, means for causing relative rotation of said die structure and said rollers so that said rollers will travel over said inner cylindrical surfaces and form moving wedge-shaped spaces between the rollers and the inner cylindrical surface, a center feed assembly mounted on said housing for delivering feed material into the cylindrical die structure and into the wedge-shaped spaces formed between the rollers and the die structure and a feed chute for delivering feed material to the center feed assembly, said center feed assembly including a shaft extending axially of the center feed assembly, a plurality of flights disposed on the shaft to form an auger which is driven independently of the rollers and the die structure underlying the feed chute for delivering feed material from the feed chute and supplying the same axially of the center feed assembly, said center feed assembly also including a blade assembly mounted on said shaft and extending from the termination of said auger to said roller assemblies, said blade assembly including portions which are disposed adjacent the outer ends of the rollers and the ends of said wedge-shaped spaces.

11. A pellet mill as in claim 10 wherein said portions are inclined at an angle with respect to the axes of rotation of the rollers.

12. A pellet mill as in claim 11 wherein said blade assembly includes a plurality of additional blades, said additional blades being spaced axially of the shaft and being inclined at an angle with respect to the axis of the shaft.

13. A pellet mill as in claim 10 wherein said center feed assembly and the die structure has a diameter of approximately the same as that of the die structure.

* * * * *